(No Model.)

T. P. WALTER.
PNEUMATIC TIRE.

No. 594,046.  Patented Nov. 23, 1897.

Witnesses
Edwin G. McKee
U. B. Hillyard.

Inventor
Theophiel Paul Walter
By his Attorneys,
C. A. Snow & Co.

UNITED STATES PATENT OFFICE.

THEOPHIEL P. WALTER, OF BEATRICE, NEBRASKA, ASSIGNOR OF ONE-HALF TO ALBERTUS H. KIDD, OF SAME PLACE.

PNEUMATIC TIRE.

SPECIFICATION forming part of Letters Patent No. 594,046, dated November 23, 1897.

Application filed April 29, 1897. Serial No. 634,405. (No model.)

*To all whom it may concern:*

Be it known that I, THEOPHIEL P. WALTER, a citizen of the United States, residing at Beatrice, in the county of Gage and State of Nebraska, have invented a new and useful Pneumatic Tire, of which the following is a specification.

Bicycles and other vehicles and road machines equipped with pneumatic tires are frequently crippled by injury to the tire in the shape of a puncture or rupture, whereby an opening is provided for the escape of the air previously pumped into the tire for holding it inflated. Many have been the attempts to provide for the quick repair of such puncture or rupture to enable the machine or vehicle to proceed, and all of the methods and devices heretofore resorted to require an outfit or patching-kit, including cement and instruments for introducing the cement into the puncture for healing it or cementing a patch thereover.

The purpose of this invention is to obviate the many objections urged against the methods in vogue for mending a tire disabled through a puncture or rupture without requiring the rider to provide himself with cement, patches, and a kit of tools.

In accordance with this invention the tire is provided on its inner side with a flexible strip, tissue, or ply either in one piece or a number of sections and arranged so as to cover every possible vulnerable point, and this patching strip, tissue, or web is coated on the side opposite the wall of the tire with a rubber or other cement and permitted to dry and coated with soapstone or other substance to prevent adhesion except at the will of the user and upon the introduction of a solvent for the cement in the event of the tire becoming punctured or disabled through rupture, the said solvent being introduced into the tire through the opening.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
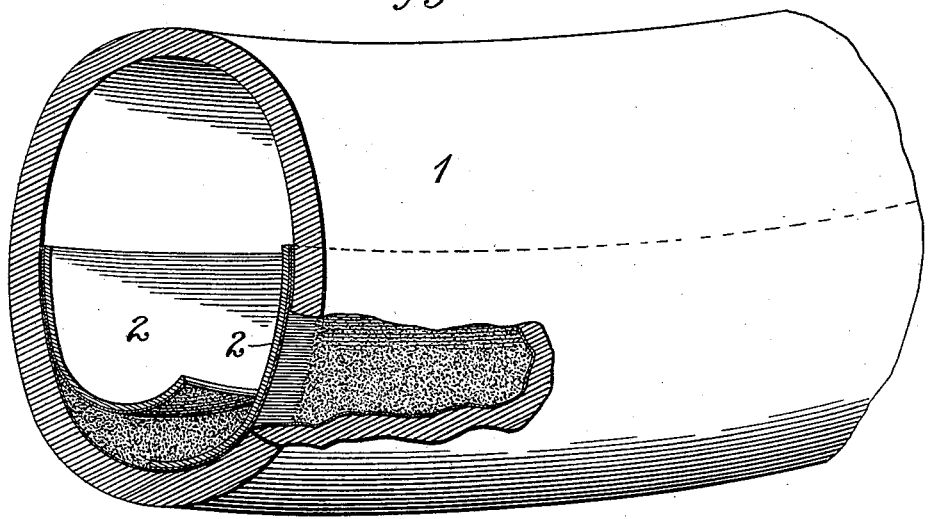
Figure 2:
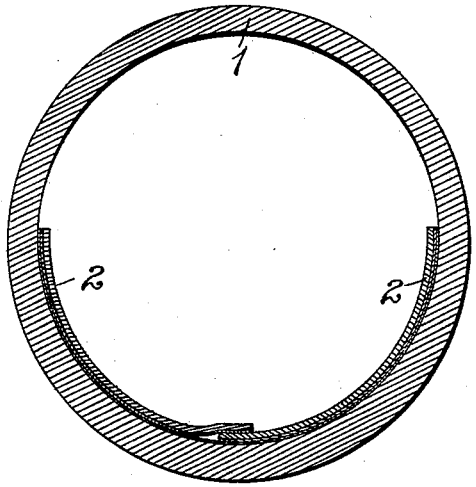

Figure 1 is a perspective view of a portion of a pneumatic tire, showing the application of the invention. Fig. 2 is a transverse section thereof.

Corresponding and like parts are referred to in the following description and indicated in the several views of the drawings by the same reference-characters.

The pneumatic tire or air-tube 1 is of ordinary construction and is provided on its inner side with a patching strip, tissue, web, or ply 2, of rubber or other flexible material, and held in place so as to move inward when engaged by the point of a sharp object penetrating the tire, so as not to be injured. This patching-strip is coated on the side facing the inner wall of the tire with a rubber or other cement commonly employed in the art for patching devices of this character, and the cement is allowed to dry and is protected by a covering of powdered soapstone or other substance, so as to prevent the premature adhesion of the strip to the tire, which would be objectionable, because if the strip should become cemented to the tire a puncturing object would penetrate it and thereby prevent the object of the invention being attained. The wall or side of the tire opposite the patching strip or web is likewise coated with the cementing substance, which latter, when dry, is coated in a similar manner to the prepared surface of the patching strip, web, or tissue.

In the event of the tire being punctured or ruptured a solvent, such as benzene or other menstruum, is introduced through the puncture or rupture and dissolves the cement applied to the patching-strip and tire and causes these parts to adhere when brought together by the action of the air contained within the tire, said air forcing the patching-strip over the puncture and holding the strip in place until the cement sets.

The patching strip, web, or ply 2 is provided in duplicate in the preferred form of construction, and each part is secured at its outer edge to the tire at one side of its longitudinal center, and the companion strips are of a width to overlap slightly at the center, whereby the best results are attained.

Having thus described the invention, what is claimed as new is—

1. The herein-described means for repairing a punctured tire or like inflated device, consisting of a patching-strip secured by a comparatively small margin to the inner side of the tire, a cementing substance applied to either the patching-strip or tire, or both, and allowed to dry, and rendered active or adhesive by the introduction of a solvent through the puncture, and a non-adhesive powder interposed between the patching-strip and tire, substantially as set forth.

2. The combination with a pneumatic tire, of companion patching strips or webs secured along their outer edges to the inner wall of the tire at diametrically opposite points, and having the remaining portion loose, and overlapping at their inner edges opposite the longitudinal center of the tire, a cement applied to the patching-strips or tire, or both, and allowed to become dry, and rendered adhesive by the introduction of a solvent through a puncture, and a non-adhesive powder interposed between the strips and the tire, as and for the purpose described.

In testimony that I claim the foregoing as my own I have hereto affixed my signature in the presence of two witnesses.

THEOPHIEL P. WALTER.

Witnesses:
   JOSEPHINE GILLILAND,
   FRED H. SCHMIDT.